(12) United States Patent
Komatsu et al.

(10) Patent No.: US 9,263,880 B2
(45) Date of Patent: Feb. 16, 2016

(54) LOW-FREQUENCY CIRCUIT BREAKER

(75) Inventors: Hiroyoshi Komatsu, Tokyo (JP);
Junichi Nomura, Tokyo (JP); Manabu Souda, Tokyo (JP)

(73) Assignee: Toshiba Mitsubishi-Electric Industrial Systems, Tokyo (JP)

( * ) Notice: Subject to any disclaimer, the term of this patent is extended or adjusted under 35 U.S.C. 154(b) by 458 days.

(21) Appl. No.: 13/328,321

(22) Filed: Dec. 16, 2011

(65) Prior Publication Data

US 2012/0087049 A1 Apr. 12, 2012

Related U.S. Application Data

(63) Continuation of application No. PCT/JP2009/061648, filed on Jun. 25, 2009.

(51) Int. Cl.
| | | |
|---|---|---|
| *H02H 7/00* | (2006.01) | |
| *H02H 3/00* | (2006.01) | |
| *H02H 7/12* | (2006.01) | |
| *H01H 9/54* | (2006.01) | |
| *H02J 3/38* | (2006.01) | |
| *H02M 5/458* | (2006.01) | |

(52) U.S. Cl.
CPC .............. *H02H 7/1216* (2013.01); *H01H 9/542* (2013.01); *H02J 3/386* (2013.01); *H02M 5/4585* (2013.01); *Y02E 10/763* (2013.01)

(58) Field of Classification Search
USPC .................... 361/110, 100, 220, 21, 102, 115
See application file for complete search history.

(56) References Cited

U.S. PATENT DOCUMENTS

| | | | | |
|---|---|---|---|---|
| 4,142,136 | A | * | 2/1979 | Witter ........................... 318/779 |
| 4,438,474 | A | * | 3/1984 | Paice ............................... 361/58 |
| 5,376,828 | A | * | 12/1994 | Kim et al. ....................... 307/64 |
| 5,561,579 | A | * | 10/1996 | Gyugyi et al. ........... H02H 7/30 361/100 |
| 5,650,901 | A | * | 7/1997 | Yamamoto ....................... 361/8 |
| 5,726,843 | A | | 3/1998 | Arita et al. |
| 5,814,904 | A | * | 9/1998 | Galm ........................ H02J 3/38 307/130 |
| 5,953,189 | A | * | 9/1999 | Abot et al. ..................... 361/13 |
| 6,028,471 | A | * | 2/2000 | Koyama et al. ............... 327/438 |
| 6,051,893 | A | * | 4/2000 | Yamamoto et al. ............. 307/43 |

(Continued)

FOREIGN PATENT DOCUMENTS

| | | |
|---|---|---|
| EP | 0 757 421 | 9/2002 |
| EP | 1 677 323 | 7/2006 |

(Continued)

OTHER PUBLICATIONS

Office Action from the German Patent and Trademark Office for German Patent Application 11 2009 005 004.2, dated Jun. 4, 2013.

(Continued)

*Primary Examiner* — Thienvu Tran
*Assistant Examiner* — Angela Brooks
(74) *Attorney, Agent, or Firm* — Finnegan, Henderson, Farabow, Garrett & Dunner, LLP

(57) ABSTRACT

An object is to obtain a low-frequency circuit breaker which has a simple configuration and a small size as a whole and is advantageous in view of costs. There is provided a low-frequency circuit breaker, in which a semiconductor switch and a mechanical switch are connected in parallel with each other. The semiconductor switch is configured by connecting a thyristor and a thyristor in anti-parallel with each other. These members are controlled by the circuit breaker control circuit.

4 Claims, 4 Drawing Sheets

(56) References Cited

U.S. PATENT DOCUMENTS

| | | | |
|---|---|---|---|
| 6,111,377 A * | 8/2000 | Hertzog et al. | 318/400.26 |
| 6,385,066 B1 * | 5/2002 | Garces et al. | H02M 1/32 363/128 |
| 6,465,911 B1 * | 10/2002 | Takeda et al. | H02J 3/005 307/115 |
| 7,459,804 B2 * | 12/2008 | Marwali et al. | H02J 3/005 307/127 |
| 8,810,985 B2 * | 8/2014 | Demetriades et al. | 361/102 |
| 2005/0151377 A1 * | 7/2005 | Ichinose et al. | 290/44 |
| 2009/0201617 A1 * | 8/2009 | Yamaguchi | 361/93.9 |
| 2010/0006544 A1 * | 1/2010 | Onufriyenko et al. | 218/154 |
| 2011/0134574 A1 * | 6/2011 | Ritter | 361/21 |
| 2012/0218676 A1 * | 8/2012 | Demetriades et al. | 361/115 |
| 2013/0057227 A1 * | 3/2013 | Aurtenetxea et al. | 322/28 |

FOREIGN PATENT DOCUMENTS

| | | |
|---|---|---|
| JP | 3-129614 | 6/1991 |
| JP | 3-296117 | 12/1991 |
| JP | 7-105789 | 4/1995 |
| JP | 8-148067 | 6/1996 |
| JP | 9-237542 | 9/1997 |
| JP | 2003-132768 | 5/2003 |
| JP | 2003-264932 | 9/2003 |
| JP | 2004-180401 | 6/2004 |
| JP | 2006-141162 | 6/2006 |
| JP | 2006-311684 | 11/2006 |
| JP | 2007-124780 | 5/2007 |
| JP | 2008-283747 | 11/2008 |

OTHER PUBLICATIONS

Office Action by the Japanese Patent Office mailed Jan. 8, 2013, for counterpart Japanese Patent Application No. 2011-519444, and English translation thereof (5 pages total).

International Search Report from Japanese Patent Office for International Application No. PCT/JP2009/061648, Mailed Aug. 18, 2009.

Office Action by the Japanese Patent Office mailed Oct. 9, 2012, for counterpart Japanese Patent Application No. 2011-519444, and English translation thereof (4 pages).

International Preliminary Report on Patentability and Written Opinion issued by the International Bureau of WIPO on Jan. 17, 2012, for International Application No. PCT/JP2009/061648.

First Office Action from the Japan Patent Office Mailed Jan. 14, 2014, for counterpart Japanese Patent Application No. 2012-269703, and English translation thereof (5 pages total).

Final Office Action from the Japan Patent Office, mailed Aug. 19, 2014, for counterpart Japanese Patent Application No. JP-2012-269703, and English translation thereof (7 pages total).

Decision of Rejection from the Japan Patent Office, mailed Mar. 31, 2015, for counterpart Japanese Patent Application No. JP 2012-269703, and English translation thereof (5 pages total).

* cited by examiner

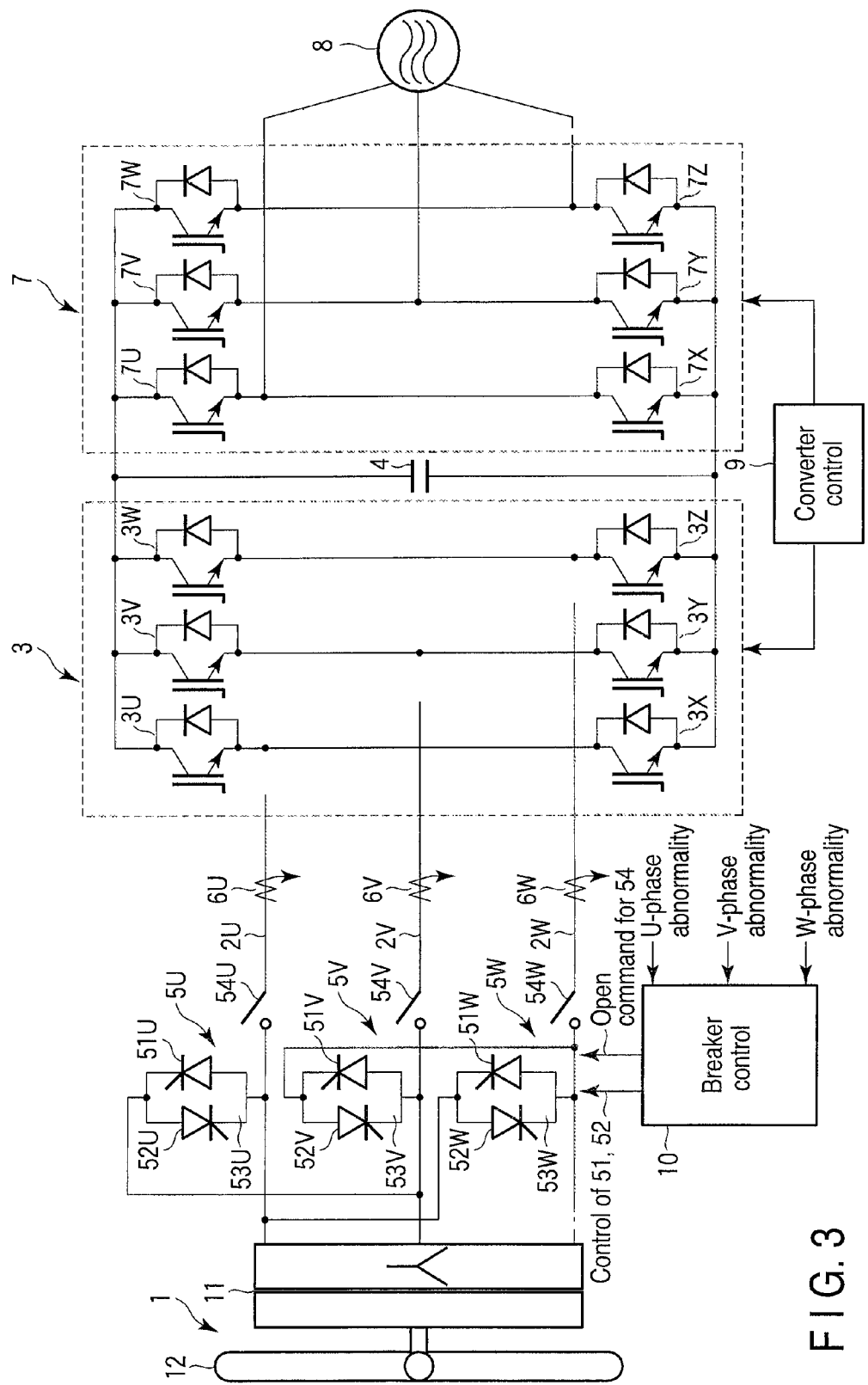
F I G. 3

LOW-FREQUENCY CIRCUIT BREAKER

CROSS REFERENCE TO RELATED APPLICATIONS

This application is a Continuation Application of PCT Application No. PCT/JP2009/061648, filed Jun. 25, 2009, the entire contents of which are incorporated herein by reference.

BACKGROUND OF THE INVENTION

1. Field of the Invention

The present invention relates to a low-frequency circuit breaker (low-frequency-current circuit breaker) which is applied to, for example, a wind generator system and cuts off a current having a frequency of about 10 to 20 Hz.

2. Description of the Related Art

Conventionally, as an example of a wind generator system, there is a system configured to convert three-phase alternating-current power generated by a permanent-magnet-type wind generation installation into direct current by a converter to which, for example, an IGBT element is bridge-connected. This current is converted into alternating-current power by an inverter to which, for example, an IGBT element is bridge-connected, and is supplied to an alternating-current load.

In a system configured as described above, a short-circuit accident can be considered to occur in an IGBT element which forms part of a converter due to some reason. When an IGBT element short-circuits, a short-circuit current continues to flow through a diode connected in anti-parallel to the IGBT element. However, at present, there is no circuit breaker for general purpose use, which can cut off a fault current caused by a short-circuit accident, and therefore, development of a circuit breaker for general purpose use is demanded.

A permanent-magnet-type wind generator installation cannot control a field current and hence needs to cut off a current flowing through a line between stators. Unless the fault current is cut off, a properly working semiconductor device such as an IGBT forming part of a main circuit of a converter may be broken.

A synchronous power generator which is used in the permanent-magnet-type wind generator installation has a high internal impedance. There exists a situation that only a short-circuit current which is at most approximately twice greater than a normal current flows even when an IGBT element causes a short circuit Therefore, a current limiting means such as a fuse cannot be used.

Conventionally, an alternating current which is generated by a wind generator installation and flows through an alternating-current path is, for example, a low-frequency current of 10 to 20 Hz. There is a demand for development of a circuit breaker which is advantageous in view of costs, with a simple configuration capable of cutting off the low-frequency current.

At present, a circuit breaker for a direct current is used in a wind generator system. An example of the circuit breaker for a direct current is configured by connecting a thyristor bulb in parallel with a bypass switch such as a gas circuit breaker, as disclosed in Patent Document 1.

Patent Document 1: Jpn. Pat. Appln. KOKAI Publication No. 7-105789

However, in a direct-current circuit breaker according to Patent Document 1, a thyristor bulb and a gas circuit breaker which form part of the circuit breaker both have large sizes and are disadvantageous in view of costs.

A circuit breaker comprising only a thyristor switch naturally causes conduction loss due to conduction.

BRIEF SUMMARY OF THE INVENTION

The present invention hence has an object of providing a low-frequency circuit breaker which is advantageous in view of costs and causes low loss.

To achieve the object, according to the invention corresponding to claim 1, there is provided a low-frequency circuit breaker, comprising:

a semiconductor switch and a mechanical switch, the semiconductor switch configured by connecting first and second thyristors in anti-parallel with each other, wherein the semiconductor switch and the mechanical switch are connected in parallel with each other, and are connected in series with an alternating-current path forming part of an alternating-current circuit, and the mechanical switch is constantly made conductive to cause a conduction current to flow to the alternating-current path, the first and second thyristors are made conductive by supplying a gate signal to the first and second thyristors at least immediately before current cutoff, the conduction current through the alternating-current path is switched to flow through the thyristors by opening the mechanical switch, and the gate signal to the thyristors is turned off to cut off the conduction current through the alternating-current path after switching the conduction current.

To achieve the object, according to the invention corresponding to claim 4, there is provided a low-frequency circuit breaker, comprising:

a semiconductor switch and a mechanical switch, the semiconductor switch configured by connecting first and second thyristors in anti-parallel with each other, wherein the semiconductor switch and the mechanical switch are connected in parallel with each other, and are connected in series with an alternating-current path forming part of an alternating-current circuit;

an abnormality detector which detects an abnormality of a current flowing through the alternating-current path; and a circuit breaker control circuit which makes the mechanical switch constantly conductive to cause a conduction current to flow to the alternating-current path, makes the first and second thyristors conductive by supplying a gate signal to the first and second thyristors at least immediately before current cutoff, makes the conduction current through the alternating-current path be switched to flow through the thyristors by supplying an open command to the mechanical switch when an abnormality of a current is detected, and turns off the gate signal to the thyristors after switching the conduction current, thereby to cut off an abnormal current flowing through the alternating-current path.

To achieve the object, according to the invention corresponding to claim 7, there is provided a low-frequency circuit breaker for use in a system which converts alternating-current power into electric power through an alternating-current path forming part of an alternating-current circuit by a power converter, and supplies the converted electric power to a load, comprising:

an abnormality detector which detects a short circuit of a semiconductor device forming part of the power converter;

a semiconductor switch and a mechanical switch, the semiconductor switch configured by connecting first and second thyristors in anti-parallel with each other, wherein the semiconductor switch and the mechanical switch are connected in parallel with each other, and are connected in series with the alternating-current path; and a circuit breaker control circuit which makes the mechanical switch constantly conductive to cause a conduction current to flow to the alternating-current path, makes the first and second thyristors conductive by supplying a gate signal to the first and second thyristors at least immediately before current cutoff, makes the conduction current through the alternating-current path be switched to flow through the thyristors by supplying an open command to the mechanical switch when a short circuit of a semiconductor device forming part of the power converter is detected by the abnormality detector, and turns off the gate signal to the thyristors after switching the conduction current, thereby to cut off an abnormal current flowing through the alternating-current path.

To achieve the object, according to the invention corresponding to claim 10, there is provided a low-frequency circuit breaker for use in a wind generator system which converts alternating-current power generated by a permanent-magnet-type wind generator installation into electric power through an alternating-current path forming part of an alternating-current circuit by a power converter made of an IGBT element, and supplies the converted electric power to a load, comprising:

an abnormality detector which detects an abnormality of a current flowing through the alternating-current path or detects a short circuit of the IGBT element;

a semiconductor switch and a mechanical switch, the semiconductor switch configured by connecting first and second thyristors in anti-parallel with each other, wherein the semiconductor switch and the mechanical switch are connected in parallel with each other, and are connected in series with the alternating-current path; and a circuit breaker control circuit which makes the mechanical switch constantly conductive to cause a conduction current to flow to the alternating-current path, makes the first and second thyristors conductive by supplying a gate signal to the first and second thyristors at least immediately before current cutoff, makes the conduction current through the alternating-current path be switched to flow through the thyristors by supplying an open command to the mechanical switch when an abnormality of a current is detected or a short circuit of the IGBT element is detected by the abnormality detector, and turns off the gate signal to the thyristors after switching the conduction current, thereby to cut off an abnormal current flowing through the alternating-current path.

According to the invention corresponding to any one of claims 2, 5, 8, and 11, the semiconductor switch and mechanical switch in claims 1, 4, 7, and 10 are modified as described below.

That is, the low-frequency circuit breaker comprises:

a semiconductor switch and a mechanical switch, the semiconductor switch configured by connecting first and second thyristors in anti-parallel with each other, wherein the mechanical switch is connected in series with alternating-current paths forming part of an alternating-current circuit, and the semiconductor switch is connected between different ones of the alternating-current paths, and the mechanical switch is constantly made conductive to cause a conduction current to flow to the alternating-current paths, the first and second thyristors are made conductive by supplying a gate signal to the first and second thyristors at least immediately before current cutoff, the conduction current through the alternating-current paths is switched to flow through the thyristors by opening the mechanical switch, and the gate signal to the thyristors is turned off to cut off the conduction current through the alternating-current paths after switching the conduction current.

Furthermore, according to the invention corresponding to any one of claims 3, 6, 9, and 12, the semiconductor switch and mechanical switch in claims 1, 4, 7, and 10 are modified as described below.

That is, the low-frequency circuit breaker comprises:

a semiconductor switch and a mechanical switch, the semiconductor switch comprising first and second thyristors and first and second full-wave rectifiers made of semiconductor devices, wherein the semiconductor switch and the mechanical switch are connected in parallel with each other, and are connected in series with an alternating-current path forming part of an alternating-current circuit, the semiconductor switch is configured by connecting a negative pole of the first rectifier with an anode of the first thyristor, by connecting a cathode of the first thyristor with a positive pole of the second rectifier, connecting a positive pole of the first rectifier with a cathode of the second thyristor, and connecting an anode of the second thyristor with a negative pole of the second rectifier, and the mechanical switch is constantly made conductive to cause a conduction current to flow to the alternating-current path, the first and second thyristors are made conductive by supplying a gate signal to the first and second thyristors at least immediately before current cutoff, the conduction current through the alternating-current path is switched to flow through the thyristors by opening the mechanical switch, and the gate signal to the thyristors is turned off to cut off the current through the alternating-current path after switching the conduction current.

According to the invention, there is provided a low-frequency circuit breaker which has a simple configuration and a small size as a whole, is advantageous in view of costs, and can reduce loss since a current constantly flows through a mechanical switch during normal work.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a schematic block diagram showing the second embodiment according to a low-frequency circuit breaker of the invention.

DETAILED DESCRIPTION OF THE INVENTION

Hereinafter, embodiments of the invention will be described with reference to the drawings. At first, the first embodiment will be described with reference to a schematic block diagram in FIG. 1 and a timing chart in FIG. 2.

Figure 1:
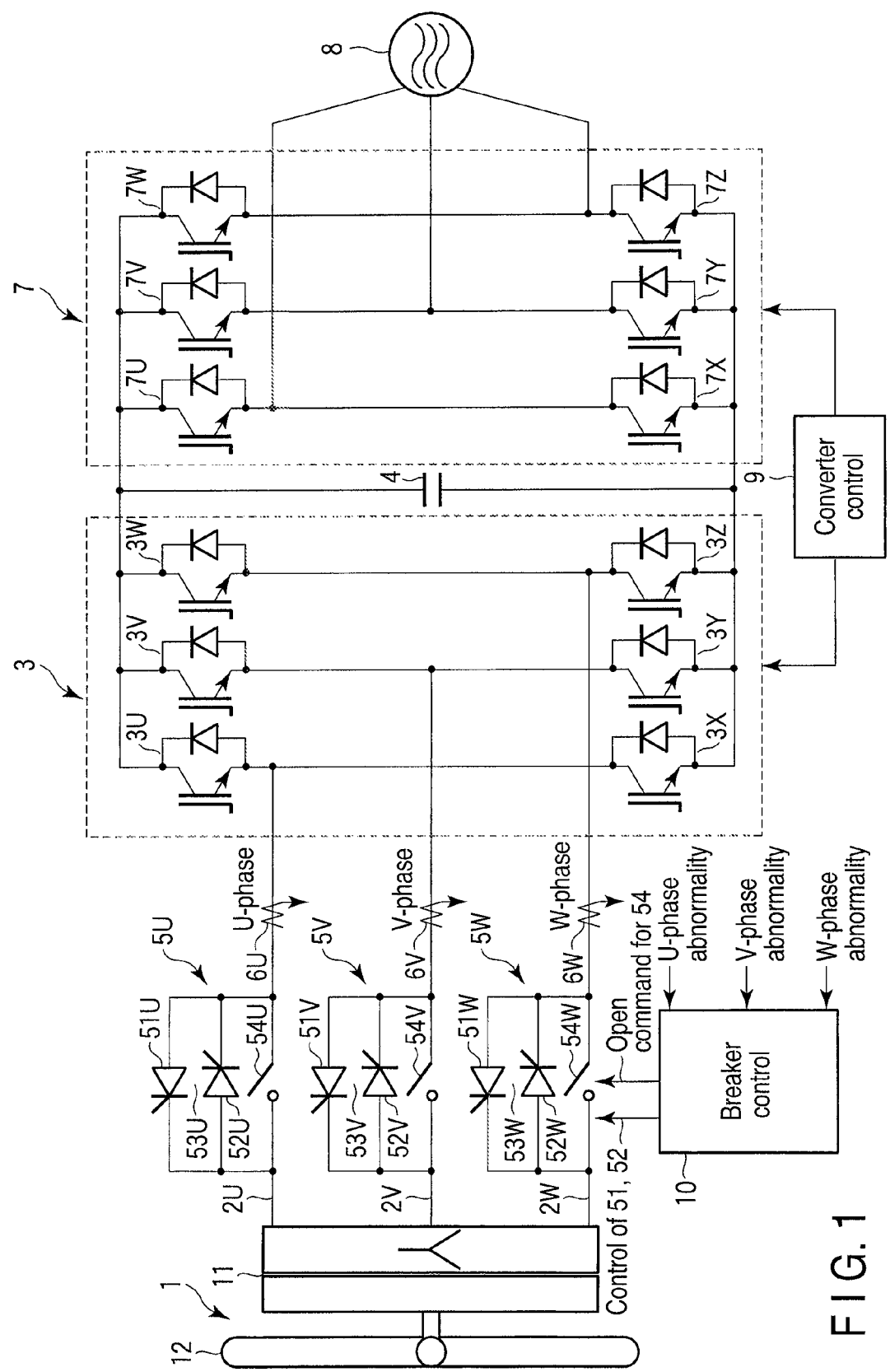
FIG. 1 is a schematic block diagram showing the first embodiment according to a low-frequency circuit breaker of the invention.

FIG. 1 shows a wind generator system which converts alternating-current power generated by a wind generator installation 1 into direct-current power by a power converter, such as a converter 3, through three-phase alternating-current paths 2U, 2V, and 2W (generally referred to as 2) which form part of a three-phase alternating-current circuit. The wind generator system further converts the converted direct-current power into alternating-current power by an inverter 7, and supplies the alternating-current power to an alternating-current load 8. In the figure, 4 denotes a smoothing capacitor.

Low-frequency circuit breakers 5U, 5V, and 5W (generally referred to as 5) are connected in series with alternating-current paths 2 for respective phases. Further, abnormality detectors 6U, 6V, and 6W (generally referred to as 6) are provided in series with the alternating-current paths 2 for the respective phases. Abnormalities of currents flowing through the alternating-current paths 2 are respectively detected by the abnormality detectors 6, and abnormality detection signals are input to a circuit breaker control circuit 10, as shown in FIG. 2(a). When an abnormality detection signal is input to the circuit breaker control circuit 10, the low-frequency circuit breakers 5 perform a cutoff operation.

The low-frequency circuit breaker 5U is configured by connecting a semiconductor switch 53U and a mechanical switch 54U in parallel with each other, and the semiconductor switch 53U is configured by connecting a first thyristor 51U and a second thyristor 52U in anti-parallel with each other. These members are controlled by the circuit breaker control circuit 10 described later. Like the low-frequency circuit breaker 5U, the low-frequency circuit breaker 5V is configured by connecting a semiconductor switch 53V and a mechanical switch 54V in parallel with each other, and the low-frequency circuit breaker 5W is configured by connecting a semiconductor switch 53W and a mechanical switch 54W in parallel with each other. The semiconductor switch 53V is configured by connecting a first thyristor 51V and a second thyristor 52V in anti-parallel with each other, and the semiconductor switch 53W is configured by connecting a first thyristor 51W and a second thyristor 52W in anti-parallel with each other. These members are controlled by the circuit breaker control circuit 10 described later.

The circuit breaker control circuit 10 is input with at least one of abnormality detection signals from the abnormality detectors 6U, 6V, and 6W. When the abnormality detection signal is input, a gate signal for the thyristors 51 and 52 as FIGS. 2(d) and (e) is supplied from the circuit breaker control circuit 10. As shown in FIG. 2(f), the thyristors 51 and 52 are turned on (conduct). When the thyristors 51 and 52 are turned on, an open command is supplied to the mechanical switches 54 from the circuit breaker control circuit 10.

The wind generator installation 1 comprises a permanent magnet rotator connected directly to a wind turbine 12, and a permanent-magnet-type synchronous generator 11 made of a stator coil. The converter 3 bridge-connects power converter elements 3U, 3V, 3W, 3X, 3Y, and 3Z. Each of the power converter elements is configured by connecting an arc self-extinguishing element such as an IGBT and a diode in anti-parallel with each other. Each of the power converter elements can be turned on/off by a converter control circuit 9.

Operation of the low-frequency circuit breakers 5 configured as described above will now be described with reference to FIG. 2. FIG. 2(a) shows a current waveform of only one phase 2U of the alternating-current paths 2, e.g., a current waveform which flows through the alternating-current path 2U when one power converter element 3U of the converter 3 short-circuits. When the current waveform increases to be greater than a reference value, as shown in FIG. 2(a), the abnormality detector 6U performs abnormality detection. A result of the abnormality detection is input to the circuit breaker control circuit 10. Then, a gate signal for the thyristors 51 and 52 is supplied from the circuit breaker control circuit 10, as shown in FIGS. 2(d) and (e). The thyristors 51 and 52 are turned on (conduct), as shown in FIG. 2(f). When the thyristors 51 and 52 are turned on, the corresponding mechanical switch 54 is supplied with an open command from the circuit breaker control circuit 10, and the mechanical switch 54 is thereby opened at timing shown in FIG. 2(c).

When the mechanical switch 54 is opened, a conduction current which has been flowing through the mechanical switches 54 up to now is then switched to flow through the thyristors 51 and 52. After switching the flow, the gate signal which has been supplied from the circuit breaker control circuit 10 is turned off, the alternating current shown in FIG. 2(a) flows up to a zero cross, and the thyristors 51 and 52 are then simultaneously turned off. As a result, an abnormal current having a frequency of, for example, 10 to 20 Hz which has been flowing through the alternating-current paths is cut off.

According to the first embodiment described above, the alternating-current circuit breakers, each of which is configured by connecting the mechanical switch 54 having a simple configuration in parallel with the semiconductor switch 53 configured by the first and second thyristors in anti-parallel with each other, are connected in series with the alternating-current paths 2. The abnormality detectors which detect a current flowing through the alternating-current paths to become abnormal are provided. The circuit breaker control circuit which makes the alternating-current circuit breakers to cut off the current when an abnormality is detected by the abnormality detectors. With such a simple configuration, an abnormal low-frequency current can be cut off, advantageously for cost reduction. Also according to the embodiment of the invention, a current constantly flows through each of the mechanical switches, and causes substantially no loss. In contrast, a configuration using only thyristor switches naturally causes loss due to electric conduction.

Figure 2:
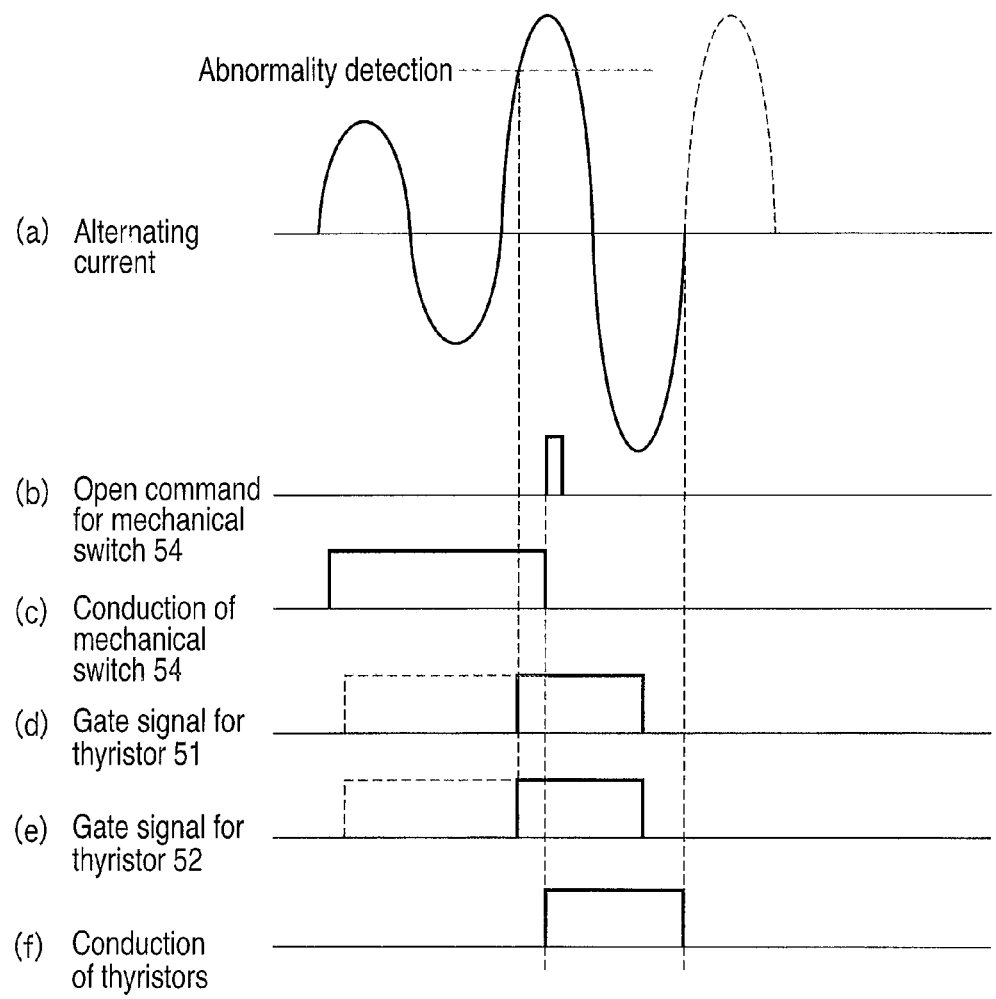
FIG. 2 is a timing chart for describing operation of FIG. 1.

In FIGS. 1 and 2, the thyristors 51 and 52 are not constantly on, in a normal state in which the conduction current is not cut off but the thyristors 51 and 52 need only to be electrically conductive at least immediately before current cutoff and may desirably satisfy this condition.

The foregoing first embodiment has been described in case where alternating-current paths form part of a three-phase alternating-current circuit. However, the first embodiment is not limited to the three-phase alternating circuit but the alternating-current paths may form part of any other type of alternating-current circuit.

Also, the foregoing first embodiment has been described about an example applied to a wind generator system. However, the first embodiment is not limited to this example but may be applied to an alternating-current circuit in which a low-frequency current flows in a different type of system.

FIG. 3 is a schematic block diagram showing the second embodiment of the invention, which will be described with reference to this figure. The embodiment shown in FIG. 3 is achieved by configuring only low-frequency circuit breakers 5U, 5V, and 5W in the first embodiment as follows. Low-frequency circuit breakers 5 have the same configuration as each other and each comprise a semiconductor switch 53 configured by connecting first and second thyristors 51 and 52 with each other, and a mechanical switch 54. The mechanical switches 54 are connected in series with the low-frequency circuit breakers 5 and alternating-current paths 2. The semiconductor switches 53 are each connected between different ones of the alternating-current paths 2. The mechanical switches 54 are constantly made conductive, to cause a conductive current to flow through the alternating-current paths 2. At least immediately before current cutoff, a gate signal is supplied to the first and second thyristors 51 and 52, to make the thyristors conductive. By opening the mechanical switches 54, the conduction current flowing through the alternating-current paths 2 is switched to the thyristors 51 and 52. After switching the current, the gate signal for the thyristors 51 and 52 is turned off, thereby to cut off the conduction current through the alternating-current paths 2. The other configurations than described above are the same as those of the embodiment in FIG. 1.

Figure 4:
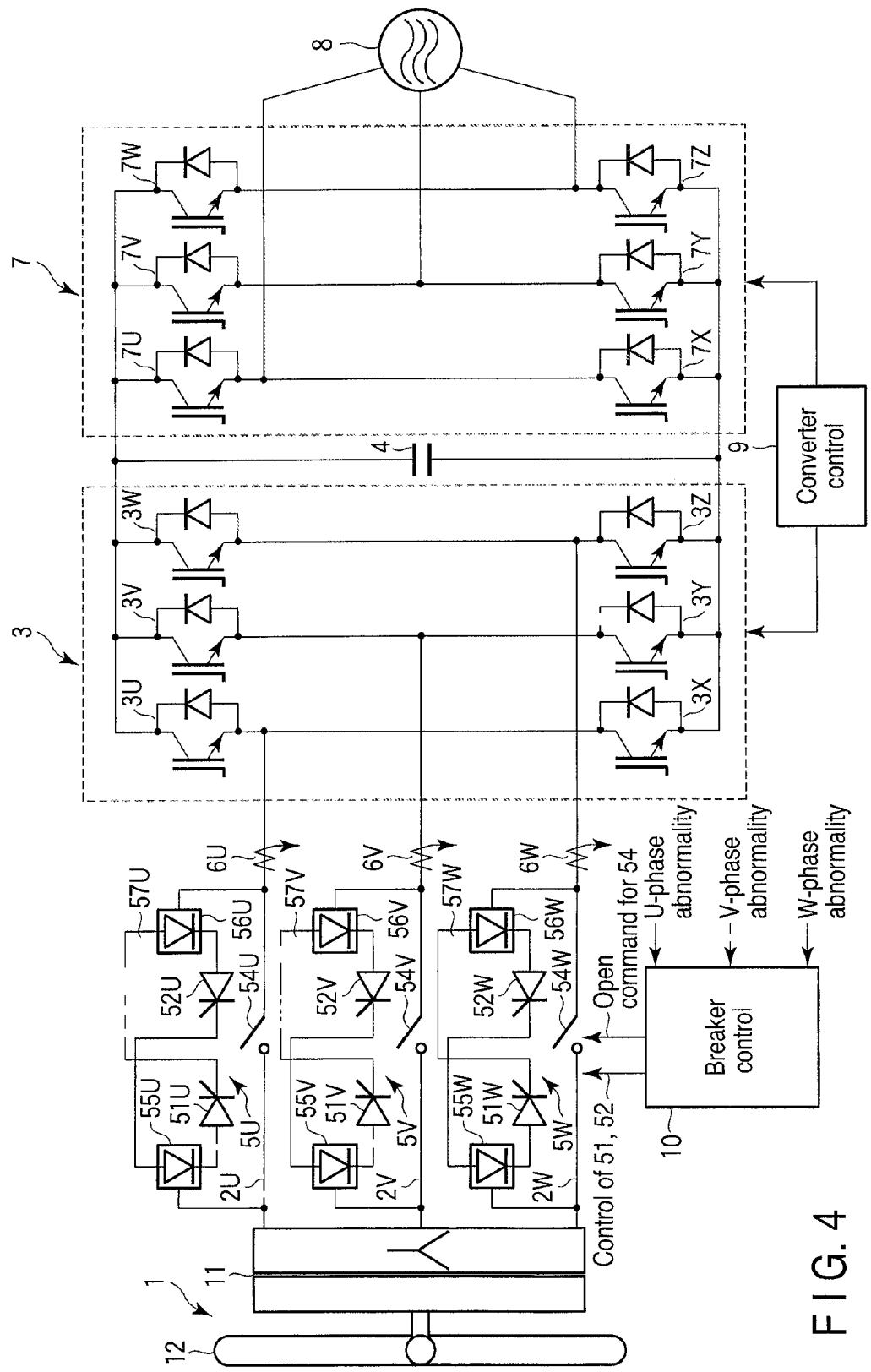
FIG. 4 is a schematic block diagram showing the third embodiment according to a low-frequency circuit breaker of the invention.

FIG. 4 is a schematic block diagram showing the third embodiment of the invention, which will be described with reference to this figure. The embodiment shown in FIG. 4 is achieved by configuring only low-frequency circuit breakers 5U, 5V, and 5W in the first embodiment as follows. Low-frequency circuit breakers 5 have the same configuration as each other and each comprise a semiconductor switch 53 configured by first and second thyristors 51 and 52 and first and second full-wave rectifiers 55 and 56 made of semiconductor devices, and a mechanical switch 54. The semiconductor switch 5 and the mechanical switch 54 are connected in parallel with each other, and are connected in series with an alternating-current path 2. In the semiconductor switch 5, a negative pole of the first rectifier 55 and an anode of the first thyristor 51 are connected to each other, and a cathode of the first thyristor 51 is connected to a positive pole of the second rectifier 56. A positive pole of the first rectifier 55 and a cathode of the second rectifier 56 are connected to each other. The anode of the second thyristor 52 and a negative pole of the second rectifier 56 are connected to each other.

In the configuration as described above, the mechanical switches 54 are constantly made conductive, and a conduction current is caused to flow through the alternating-current paths 2. At least immediately before current cutoff, a gate signal is supplied to the first and second thyristors 51 and 52, to make the thyristors conductive. By opening a mechanical switch 54, the conduction current for the alternating-current paths 2 is switched to the thyristors 51 and 52. After switching the current, the gate signal for the thyristors 51 and 52 is turned off to cut off the current.

The foregoing embodiment has been described in case where the abnormality detectors 6U, 6V, and 6W are respectively provided for the alternating-current paths 2U, 2V, and 2W. However, the embodiment is not limited to this configuration but at least a short-circuit state may be detected and an abnormality signal may then be generated. For example, a method for directly detecting a short-circuit state of an element is available. In this case, upon a signal which detects a short-circuit state of an element, the mechanical switches 54 may be opened, and ignition of the thyristors 51 and 52 may be started.

In the foregoing embodiment, alternating-current power is converted into direct current by the converter 3. Further, the direct-current power is converted into alternating-current power by the inverter 7, and is supplied to the alternating-current load 8. However, the inverter 7 may be omitted, and the direct-current power as an output from the converter 3 may be supplied to an unillustrated direct-current load.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A low-frequency circuit breaker, comprising:
   a semiconductor switch and a mechanical switch, the semiconductor switch configured by connecting first and second thyristors in anti-parallel with each other, wherein the semiconductor switch and the mechanical switch are connected in parallel with each other, and are connected in series with an alternating-current path forming part of an alternating-current circuit;
   an abnormality detector to detect an abnormal current flowing through the alternating-current path; and
   a circuit breaker control circuit configured to make the mechanical switch constantly conductive to cause a conduction current to flow to the alternating-current path, make the first and second thyristors conductive, in response to the detected abnormal current, by supplying a gate signal to the first and second thyristors at least immediately before current cutoff, switch the conduction current through the alternating-current path to flow through the thyristors by opening the mechanical switch after supplying the gate signal to the first and second thyristors, and turn off the gate signal to the thyristors to cut off the conduction current through the alternating-current path after switching the conduction current.

2. A low-frequency circuit breaker, comprising:
   a semiconductor switch and a mechanical switch, the semiconductor switch configured by connecting first and second thyristors in anti-parallel with each other, wherein the semiconductor switch and the mechanical switch are connected in parallel with each other, and are connected in series with an alternating-current path forming part of an alternating-current circuit;
   an abnormality detector which detects an abnormality of a current flowing through the alternating-current path; and
   a circuit breaker control circuit which makes the mechanical switch constantly conductive to cause a conduction current to flow to the alternating-current path, makes the first and second thyristors conductive, in response to the detected abnormality, by supplying a gate signal to the first and second thyristors at least immediately before current cutoff, makes the conduction current through the alternating-current path be switched to flow through the thyristors by supplying an open command to the mechanical switch after supplying the gate signal to the first and second thyristors, and turns off the gate signal to the thyristors after switching the conduction current, thereby to cut off an abnormal current flowing through the alternating-current path.

3. A low-frequency circuit breaker for use in a system which converts alternating-current power into electric power through an alternating-current path forming part of an alternating-current circuit by a power converter, and supplies the converted electric power to a load, comprising:
   an abnormality detector which detects a short circuit of a semiconductor device forming part of the power converter;
   a semiconductor switch and a mechanical switch, the semiconductor switch configured by connecting first and second thyristors in anti-parallel with each other, wherein the semiconductor switch and the mechanical switch are connected in parallel with each other, and are connected in series with the alternating-current path; and a circuit breaker control circuit which makes the mechanical switch constantly conductive to cause a conduction current to flow to the alternating-current path, makes the first and second thyristors conductive, in response to the detected short circuit, by supplying a gate signal to the first and second thyristors at least immediately before current cutoff, makes the conduction current through the alternating-current path be switched to flow through the thyristors by supplying an open command to the mechanical switch when a short circuit of a semiconductor device forming part of the power converter is detected by the abnormality detector, and turns off the gate signal to the thyristors after switching the conduction current, thereby to cut off an abnormal current flowing through the alternating-current path.

4. A low-frequency circuit breaker for use in a wind generator system which converts alternating-current power generated by a permanent-magnet-type wind generator installation into electric power through an alternating-current path forming part of an alternating-current circuit by a power converter made of an IGBT element, and supplies the converted electric power to a load, comprising:

an abnormality detector which detects an abnormality of a current flowing through the alternating-current path or detects a short circuit of the IGBT element;

a semiconductor switch and a mechanical switch, the semiconductor switch configured by connecting first and second thyristors in anti-parallel with each other, wherein the semiconductor switch and the mechanical switch are connected in parallel with each other, and are connected in series with the alternating-current path; and a circuit breaker control circuit which makes the mechanical switch constantly conductive to cause a conduction current to flow to the alternating-current path, makes the first and second thyristors conductive, in response to the detected abnormality or short circuit, by supplying a gate signal to the first and second thyristors at least immediately before current cutoff, makes the conduction current through the alternating-current path be switched to flow through the thyristors by supplying an open command to the mechanical switch when an abnormality of a current is detected or a short circuit of the IGBT element is detected by the abnormality detector, and turns off the gate signal to the thyristors after switching the conduction current, thereby to cut off an abnormal current flowing through the alternating-current path.

* * * * *